May 30, 1967     J. L. BARKER ETAL     3,322,940
CENTRALIZED DIGITAL TRAFFIC COUNTING SYSTEM
FOR RECORDING AND CONTROL
Filed Jan. 7, 1963     7 Sheets-Sheet 1
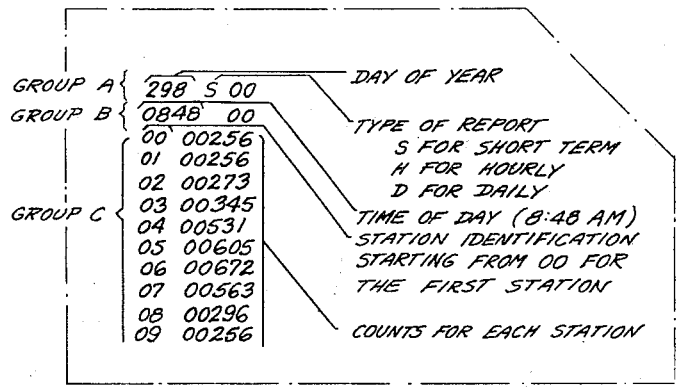
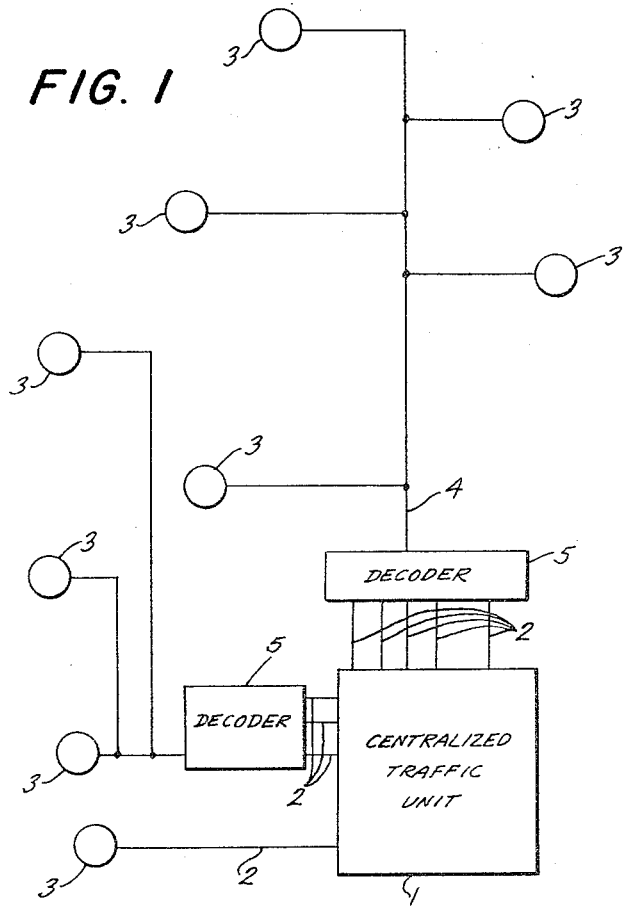
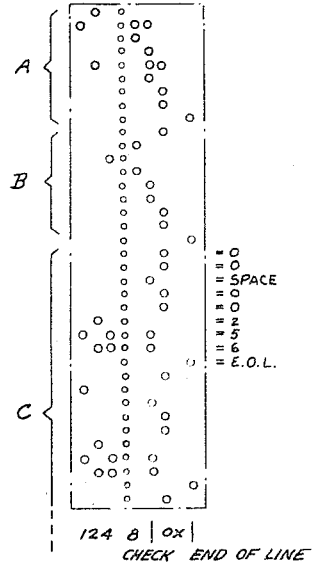
INVENTORS
JOHN L. BARKER
FRED W. HANNULA
LUDWIG R. PALLAT
BY *Edward H. Earus*
ATTORNEY

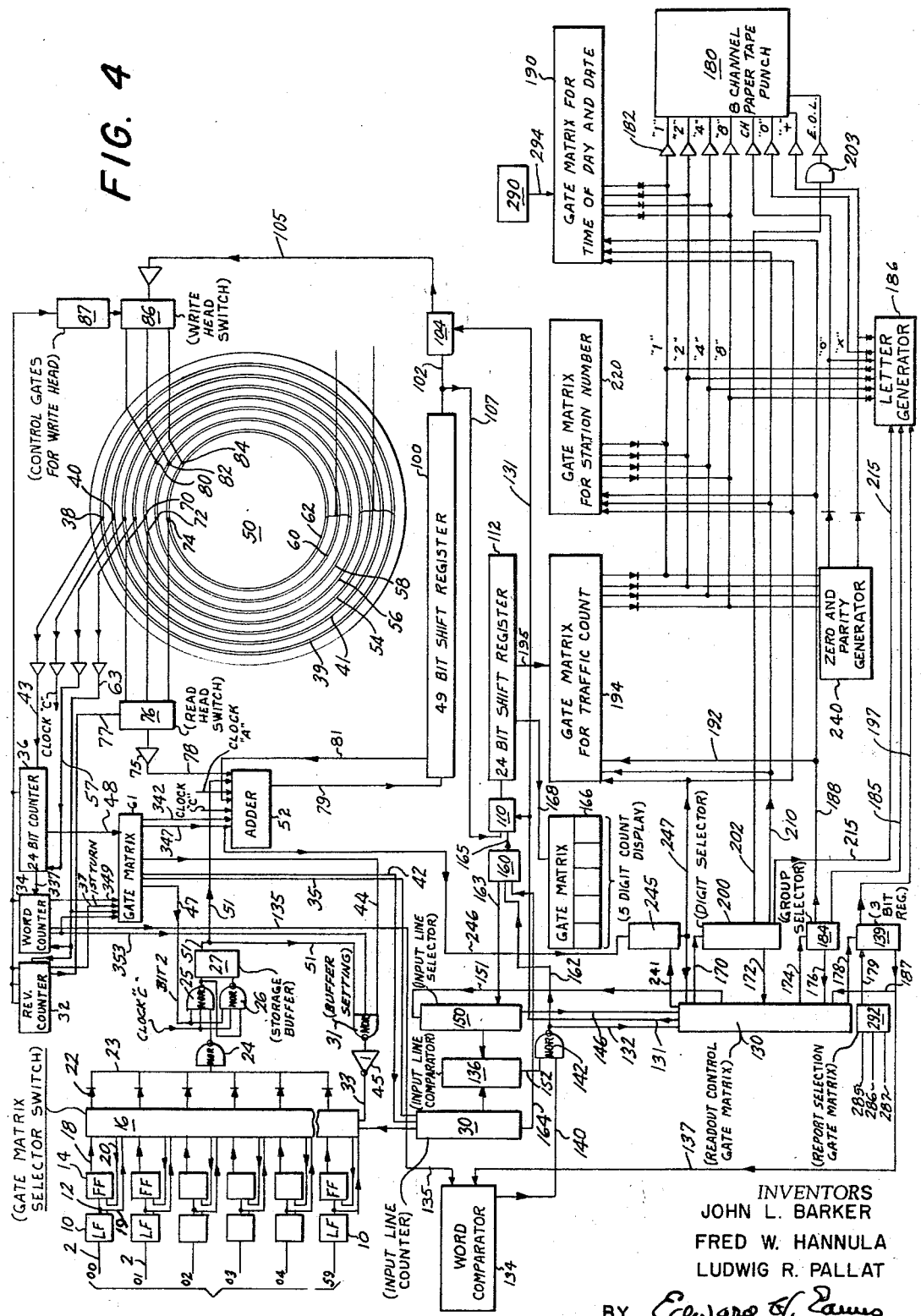

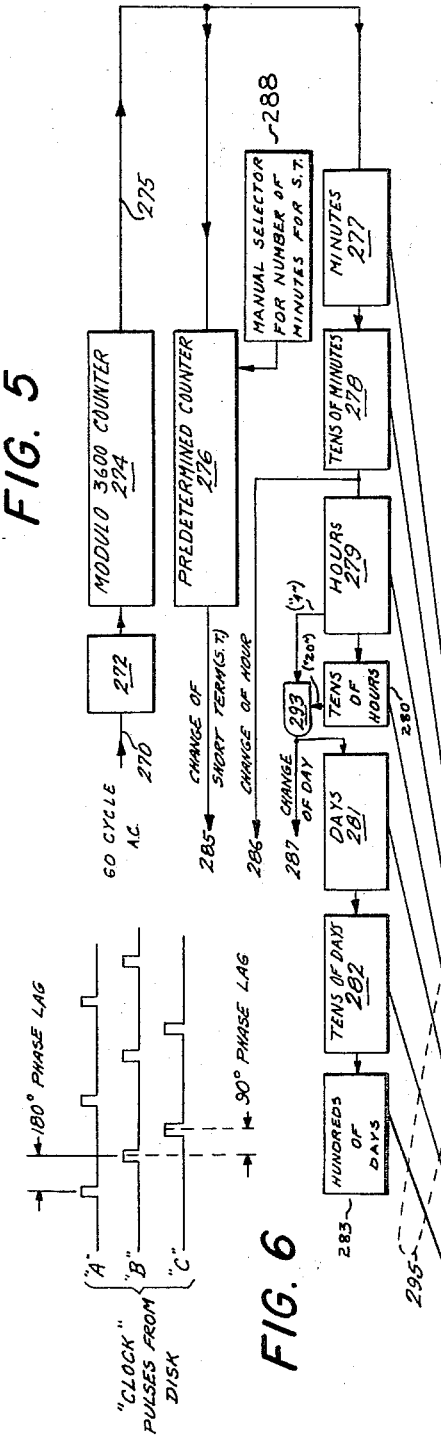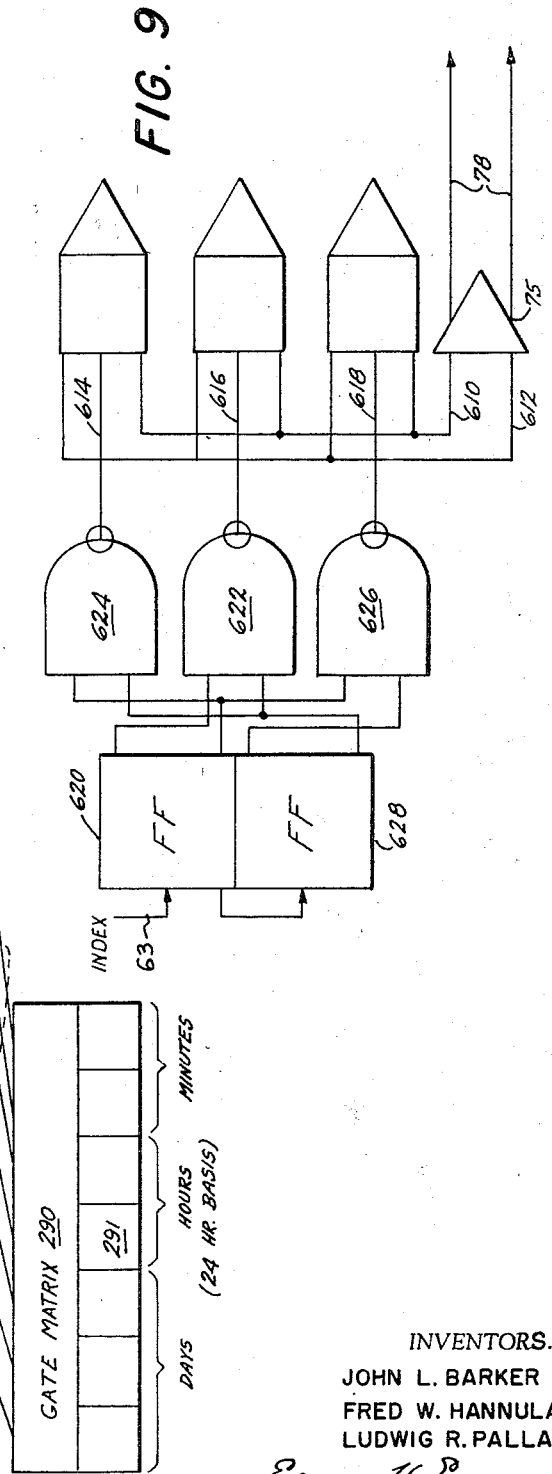

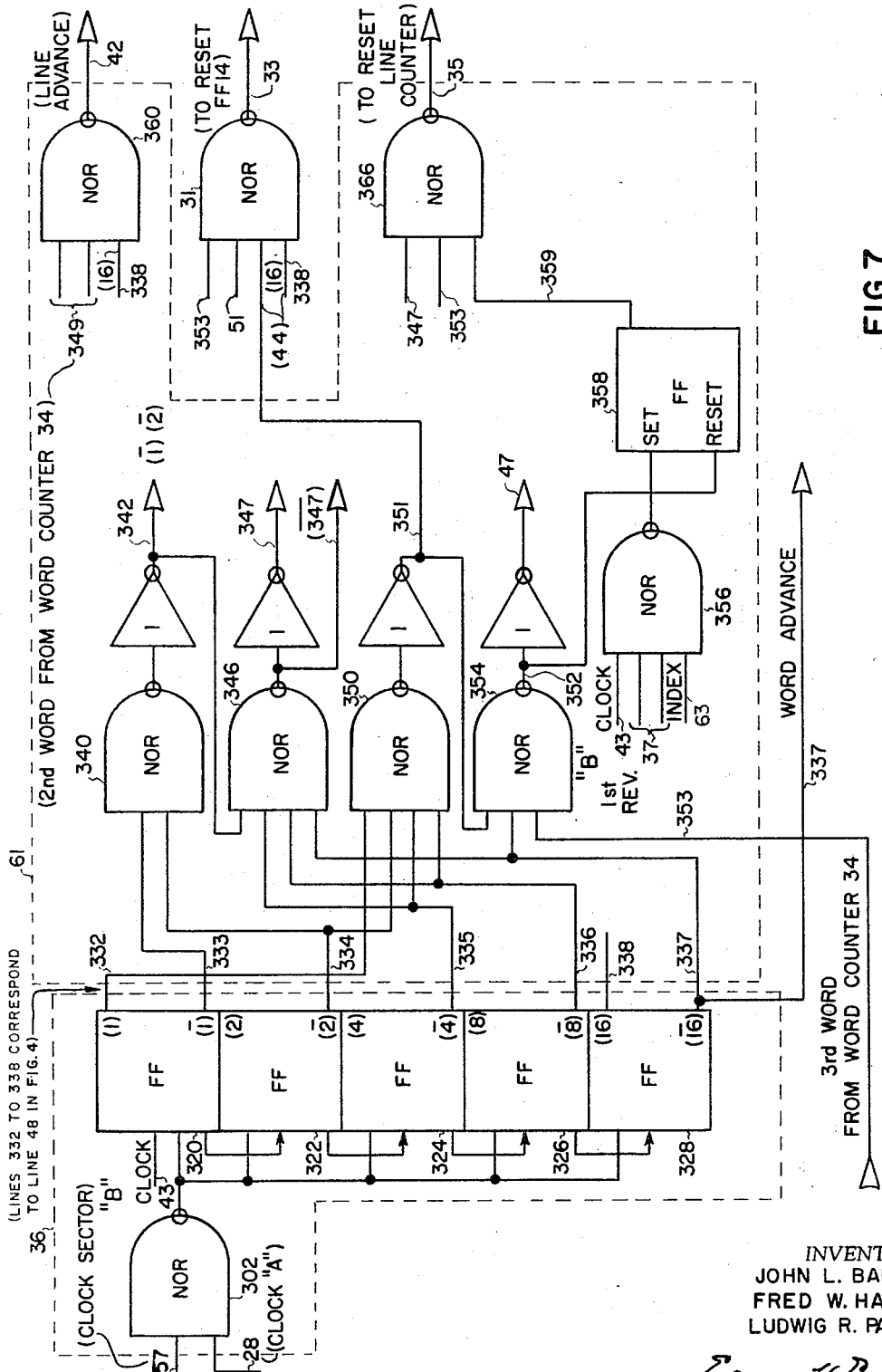

INVENTORS.
JOHN L. BARKER
FRED W. HANNULA
LUDWIG R. PALLAT

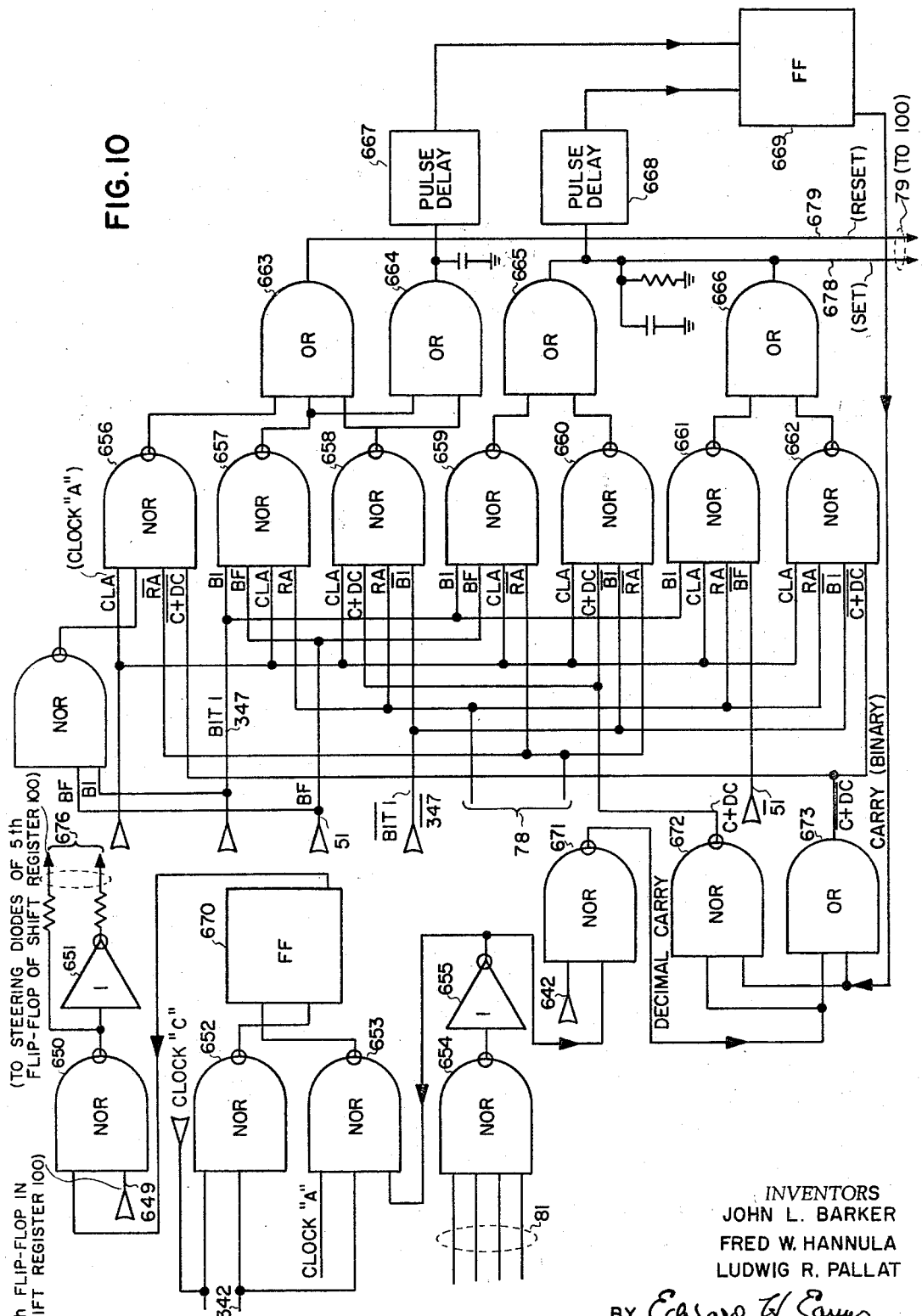

INVENTORS
JOHN L. BARKER
FRED W. HANNULA
LUDWIG R. PALLAT

BY Edward H. Eames
ATTORNEY

United States Patent Office 3,322,940
Patented May 30, 1967

3,322,940
CENTRALIZED DIGITAL TRAFFIC COUNTING SYSTEM FOR RECORDING AND CONTROL
John L. Barker, Norwalk, Conn., Fred W. Hannula, Medfield, Mass., and Ludwig R. Pallat, Rowayton, Conn., assignors to Laboratory for Electronics, Inc., Boston, Mass., a corporation of Delaware
Filed Jan. 7, 1963, Ser. No. 249,810
15 Claims. (Cl. 235—150.24)

This application relates to a centralized traffic counting, posting and recording system. In particular, it relates to a fully automated system of centrally processing and recording vehicle counting data gathered continuously and simultaneously at a series of remote counting stations.

In the field of traffic control, it is important that at one centralized point, say at a place in the center of a state, there be data available on the traffic flow on all of the major arteries throughout the state. This data should be available on an instantaneous basis and on a totalized basis for selected periods such as an hourly basis or a daily basis. The data is useful for future planning or current control purposes and, if desirable, may be utilized to regulate traffic control apparatus in particular localities.

Though in the past such data has been regularly collected in many states, such large scale vehicle counting studies have taken expensive and time-consuming processing time and have placed a heavy burden upon vital manpower and departmental budgets. In addition, being other than automatic, the possibility of error in the traffic count has been greatly increased.

This invention then has as its objects the production of a system capable of maintaining continuous up-to-date traffic data for a large area such as a state, such data being in form such as to give information on each specific reporting locality. It allows the production of such records on an automtic basis eliminating the prior manual transfer of data and can be handled through low cost party line techniques using telephone wires.

It has a further object of producing short term, hourly, daily or other desired periodic tallies by reporting stations and reducing the received information to a punched tape format directly usable in an electric typewriter or capable of direct use for control purposes.

This invention provides accurate, fast and economical means for collecting, processing, storing and recording traffic count data. If desired, it may also be used for controlling traffic signals. It incorporates a method of digital computation, memory storage, punch tape readout and modular construction, and consequently can provide vehicle counts from up to as many as 60 counting stations with constant surveillance of all stations simultaneously. At the same time, it provides for readouts of each station independently.

The circuitry of this invention allows for reports from each counting station on a short-term basis for selected periods of less than an hour, for hourly reports, and for daily reports. Each report is of a permanent nature which can be used at that time or retained for future reference purposes.

The invention is described below and shown in the attached drawings. These drawings include:

FIG. 1 is a block diagram giving a general representation of how the system can be used with numerous detection units or stations throughout a large geographic area.

FIG. 2 is a sample of printed tape such as could be produced by a "Flexowriter" or other typing unit adapted to receive punched tape and shows the form of printed report that is obtained.

FIG. 3 shows a section of punched tape from which the report of FIG. 2 was produced.

FIG. 4 is a block diagram showing the circuit system used in this invention.

FIG. 5 is another block diagram showing the digital clock associated with this circuit for timing the output of the system.

FIG. 6 is a diagram showing the phase relationship of clock pulses from a magnetic disk incorporated in the diagram of FIG. 4.

FIG. 7 is a circuit diagram of the counting portion of the block diagram of FIG. 4 and shows how the counting is controlled by the clock output pulses shown in FIG. 6.

FIG. 9 is another portion of the circuit and shows the head switches used to control the readheads which receive data from a magnetic disk.

FIG. 10 is a circuit diagram of the least significant bit half-adder used, and

Figure 8:
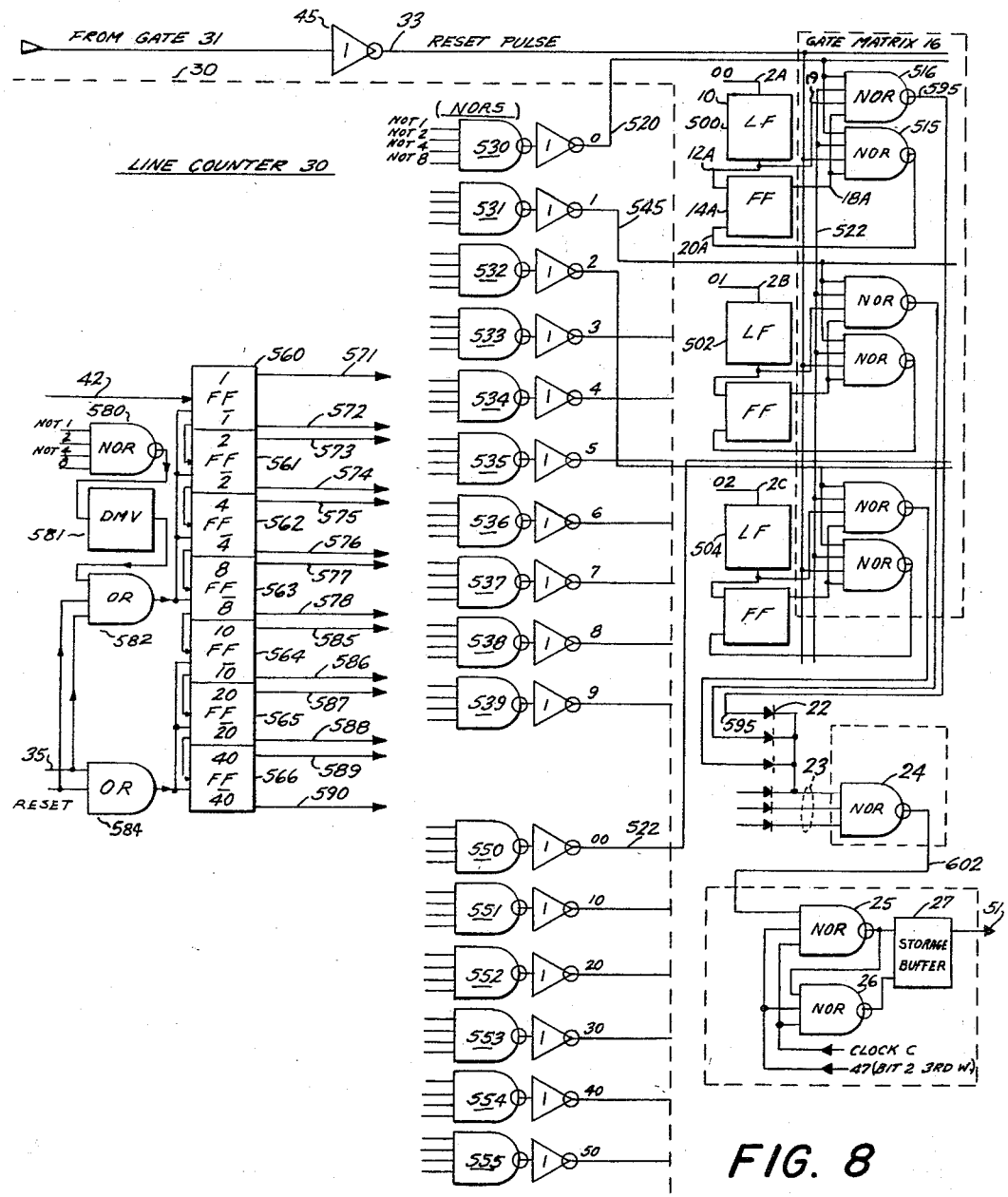
FIG. 8 is a circuit diagram showing the scanning means used to scan the incoming data from the various input lines.

The system of the present invention provides for the receipt of traffic count data from as many as 60 input lines coming from various points throughout a large geographic area. The data from these lines is temporarily stored at the input of the system and is periodically scanned by a selector switch which allows the receipt of one bit of information at a time from each of the input lines sequentially. That bit of information is then added to the several totals for the desired time periods for the same input line as previously recorded on a magnetic recording disk, the individual totals being read out from a read-head, up-dated to include the new bit, and the up-dated total recorded on the disk through a write-head. Through synchronization of the recording disk with the selector switch, the data from a given input line is always written at the same portion of the magnetic disk.

In the present invention, the information for the input line is added to each of three words on the disk, the first addition being to the word for short term count, the second addition being to the word for hourly count, and the third being to the word for daily count. In the practice of the invention there are, synchronized with the magnetic disk and the selector switch, read-heads which read-out the information from the magnetic disk, for the processing for adding whatever information is received, if any, from the input line. Thus, it can be seen that the input lines are scanned sequentially, and, if data appears on them, the data is then added to the existing data on the storage disk.

It should be noted that the rate of scanning of the input lines by the selector switch is so rapid that not more than one bit of information can be expected from each input line during the period between scanning. In the normal course of events, the scanning by the selector switch is so rapid that there most likely will be no information on the majority of the input lines during each scanning period.

The system of this invention includes as part thereof a digital clock normally actuated and timed by a 60-cycle input. This clock controls the recording period for the data on the storage disk, for daily, hourly, and short term periods. When the particular time arrives for recording of the information on the storage disk for one of the selected periods, a read-out control actuated by a gate matrix directs the data being read from the storage disk to a shift register rather than returning it through the write-heads to the disk. The data then on the shift register is relayed through another matrix to a standard eight channel tape punch. If desired the information thus recorded on the tape punch may be printed through one of the various standard forms of print-out mechanisms and/or may be used to control subsequent circuitry for traffic control purposes.

*Data input*

FIG. 1 shows in a generalized fashion the use of a centralized traffic posting unit 1 of the type contemplated by this invention having input lines 2 which carry data from a number of detector stations 3 located in areas remote to the posting unit. The detector stations 3 may be directly connected to the posting unit 1 or may be connected only indirectly through scaling units of one nature or another. Preferably the detector station shapes the pulses from a traffic actuated switch or detector before transmitting the pulses to be counted to the input lines directly or via a scaler. Thus when one of the various types of traffic detectors is used, that detector output may be through a scaledown counter so that, for example, only one detection pulse passes from detector station 3 to line for every ten detection pulses received on the traffic detector itself.

In other instances, there may be a location in which there are detectors in two lanes of traffic in both directions, i.e., for a total of four lanes with detectors counting vehicles in each lane. In such a case, if there is no interest in individual lane traffic, the output of all four detectors could be fed into a scaler which would be preset for say a ratio of four to one, thus providing an average value for traffic per lane at that particular station.

Input lines 2 normally are telephone lines running from one or more detection stations 3 to the centralized traffic posting unit. They may, of course, be individual telephone lines running from each detector to the unit. This, however, adds additional cost and is normally not advisable. Rather, the most desirable method of transmission would appear to be multiplexing. In such circumstances, by the use of proper tone coding equipment at the transmitting end and decoding equipment at the receiving end as many as 20 detector stations may be connected to one telephone line. A so-called "voice grade" type of telephone line is all that is required.

Where the information from traffic detecting plural stations 3 is multiplexed, as indicated by the "decoder" blocks 5 in FIG. 1, it will be understood that an encoder (not shown) is normally provided at each of the stations whose information is so multiplexed.

An alternative method of transmission, of course, might be to feed the information from the traffic counting station to an intermediate point and there code the information for transmission over the voice grade line. Such a combination may reduce the cost of rental for transmission lines. In instances where the state agency in question has a microwave link facility, this could be used at least in part for long distance transmission of the data.

The methods of transmission of data from the detector unit to the centralized traffic posting unit are well known and form no part of this invention.

*Printed output*

FIG. 2 shows one type of printed report that can be obtained from the present system. The report for any selected time period is on a three-group basis. The first group, which is referred to herein as "group A," is shown in the first line of a portion of tape disclosed in FIG. 2. This group shows the date and shows the type of report. The first three numbers shown "2 9 8" represent the day of the year of the report. The next figure, the letter "S" represents the type of report, in this instance short term, i.e., less than one hour. If it was an hourly report, there would be an "H"; and if a daily report, a "D." The second line is the "group B" portion which is for the time of day. In this instance a 24-hour day is used so the time 0848" represents 8:48 a.m. Correspondingly, "2048" would indicate 8:48 p.m. It will be noted that at the end of the line of both groups "A" and "B," there are two zeros which are merely nulls in the present usage.

The "group C" shown in FIG. 2 represents the remainder of the report and is the most pertinent for many purposes. Each line in the remainder of the report gives two words of information. The first is that represented by the first two digits and identifies the station that is being reported on. The remainder of the line gives the count for each station. Thus the first line of group C reads "00 00256." This then means that there has been a count of 256 from detection station 00. The next line comparably reports on the count from detection station 01. If as this unit is arranged there are 60 reporting stations, the tape shown in FIG. 2 would continue through to station 59.

*Coded output*

FIG. 3 shows a section of ordinary eight channel "I.B.M." punch tape coded on a binary basis. The input information after being processed and stored within the circuitry of this invention to be described below is periodically punched out on this eight channel one inch tape. The first four rows of punches in the tape are used for the characters 1, 2, 4, and 8. The fifth punch is used to make the number of holes punched odd as a parity check. The sixth and seventh are "O" and "X" to determine whether the line represents a letter or number in accordance with standard I.B.M. eight-channel code. The eight punch is used to show the end of a line. As can be seen the tape shown in FIG. 3 discloses the first portion of the information punched in the printed tape of FIG. 2, with some identifications added in FIG. 3 alongside the tape.

BLOCK DIAGRAM OF CIRCUIT

*Input storage*

Turning to FIG. 4, the input lines 2 are shown in the upper left-hand portion. Six lines are depicted as being representative of the sixty for which the present circuit is adapted. Each line is numbered for reference purposes to identify the counting station being reported on. Shown in FIG. 4 are lines "00", "01", "02", "03", "04", and "59". The lines "05" through "58" are omitted for the sake of simplicity. The signal on lines 2 will be either a contact closure directly from a detecting station or a pulse from a decoder (see FIG. 1). This signal passes into line filter 10 which includes, for example, an integrating input controlling transistorized forms of Schmitt trigger and following monostable multivibrator. The time constant of the integrating circuit may be of the order of 100 milliseconds, for example, for avoiding response to noise spikes such as from contact bounce.

There are line filters 10 for each of the input lines 2. Pulses received by line filters 10 are then passed through line 12 to a storage flip-flop 14 and there is a flip-flop 14 for each input line 2.

*Scanning of inputs*

The purpose of these storage flip-flops 14 is to store one incoming pulse for a period long enough for the flip-flop 14 to be reached by the scanner which is identified as gate matrix selector switch 16. In the preferred form of our invention, each of the flip-flops 14 is scanned or interrogated by switch 16 approximately every 50 milliseconds by means of the circuit of FIG. 8, to be described below.

It will be realized that since these flip-flops are scanned at such a rapid pace, there is very little possibility of the respective input lines receiving more than one pulse, i.e., more than one bit of information, during the period between scannings. Thus the circuit is adapted to receive but one bit of information at a time from each scan line at the abovementioned maximum rate. Such information may come from a detecting station having a traffic detector in a single traffic lane providing one output pulse per vehicle, for example. Where a faster pulse rate prevails as where multiple traffic lanes are involved, a scaler or temporary buffer storage device may be used to reduce the pulse rate to the permitted input rate.

The apparatus is designed to take one (1) impulse per vehicle from a single traffic lane. The rate of scanning should be adjusted to be faster than the spacing between any two successive impulses normally expected for a high degree of accuracy desired. Normally, however, due to the speed of the scanning, most of the input lines will not have received a pulse each time they are scanned. Thus buffer or flip-flop 14 need have only two conditions for storage purposes. It would be either in the "1" position or the "0" position, depending upon whether or not a count has been put into the flip-flop 14 during the scanning cycle.

It will be appreciated that the scanning rate can be adjusted to meet the pulse rate over a wide range. However, it is important that the scanning rate be fast enough so that the possibility of more than one bit of information being received on any one input line during one scanning period is remote.

It is important to note in this respect, that since there is only a "1" count possible at most, the interrogation of the respective stations for the storage of information applies only to the first bit of every word that is being stored on the storage disk 50, i.e., it applies only to the least significant bit, and so, as will be seen below, the addition done can be rapid and can be limited to least significant bit addition.

Synchronization of scanning and storage

The bits of information from the storage flip-flop 14 pass to the gate matrix selector switch 16 through the lines 18. In turn, the gate matrix selector switch, through line 20, resets each storage trigger 14, if necessary, after it has been scanned. The switching of gate matrix 16 to accomplish the desired scanning is controlled by line counter 30 which, in turn, receives its controlling pulses from counters 32, 34, and 36, each of which is associated with magnetic storage disk 50. The counters 32, 34, and 36 receive timing pulses known as clocks A, B, and C through readheads 38 and 40 which read pulses from tracks 39 and 41 respectively found on storage disk 50, all to be later described. Counters 34 and 36 also receive an index and a sector pulse respectively to reset them. These latter pulses are also recorded on the disk on tracks 56 and 54 respectively. Revolution counter 32 also receives the index pulses via line 63.

Gate matrix 61 associated with counters 32, 34 and 36 is adapted to send a line advance pulse through line 42 to line counter 30 at the end of the second word, in each successive three word group. The word and bit counters are two bits behind the revolution counter to avoid intolerance by switching transients. Gate matrix 61 also sends a reset or synchronizing pulse to line counter 30 through line 35 at the start of bit "1" of the thid word of the first revolution of the three revolution cycle of the disk 50, as more fully described below.

Thus line counter 30 is adapted to control gate matrix selector switch 16 and to cause it to advance in its scanning of the input lines 2 from line to line.

The bits of information received from input lines 2 and held in storage are then sequentially and cyclically scanned by gate matrix selector switch 16, and the output thereof fed, one input at a time, through isolating diodes 22 and lines 23 to amplifier and NOR gate 24 and thus to output gates of the "NOR" type 25 and 26 and buffer (flip-flop) 27 to serial half adders 52 via line 51 and gates 25 and 26 associated with buffer 27. Buffer 27 serves to hold the bit of information received from each particular input line while it is applied to the half adder 52. These gates are controlled through pulses from clock "C" from track 41 in combination with bit 17 of the third word from gate matrix 61, as will be later described.

Disk 50 is preferably a rotating flexible magnetic storage disk, which may be of the type sold by Laboratory for Electronics, Inc. under the trademark "Bernoulli Disk." The disk has a capacity of forty tracks, of which only seven are utilized in the system described and the remainder of which may be utilized for expansion. The outside track 39 is the clock track providing clock pulses "A" and "B." The next track 41 provides the so-called "C" pulses. The relationship of these pulses from a phase point of view is shown in FIG. 6. The "B" pulse may be derived from the "A" pulse by a simple flip-flop phase delay. These recorded pulses "A" and "C" are permanently recorded on the disk 50 and serve to synchronize all of the operations of the unit here being described.

The third track on disk 50, track 54, provides for word counting and is called the clock sector track. It provides one pulse every 24 bits. The fourth, track 56, is an indexing track and provides one pulse per revolution. The remaining tracks 58, 60 and 62 are the first, second and third data tracks which are used to record the traffic data.

Returning now to consideration of the counters actuated by the clock pulses, bit counter 36 provides an ouput at the end of the 24th bit as well as every four bits. This is because the data for each station is composed as mentioned above, of five digits and each digit is made up to four bits, making a total sum of 20 bits. The bit counter is clocked by pulse "B" from clock track 39 of the storage disk 50 and is reset by the sector pulse, track 54 on the disk 50. The output of bit counter 36 is applied through line 48 to gate matrix 61. Gate matrix 61 sends a pulse every fourth bit through lead 342 to the serial binary coded decimal (BCD) half-adder 52.

Word counter 34 is a modulo 3 counter. Its output is fed into the gate matrix 61 and also through lead 35 into line counter 30. The word counter 34 produces a pulse at the end of every three words, the purpose being to produce a pulse corresponding to desired shifts from one input line to another.

NOR gate 31 and its associated amplifier 45 are adapted for providing a reset pulse into gate matrix switch 16 through line 33 for the storage flip-flops 14. Gate 31 is controlled by the setting of buffer 27, "third word" signal on lead 353 from word counter 34, and bit 17 of the third word on lead 44. Thus, NOR gate 31 provides a reset pulse through gate matrix switch 16 and reset line 20 at the 17th bit of the third word of the recording for the particular input line in question in the event there has been a pulse on the input line and has been received in buffer flip-flop 27. Thus it can be seen that when a particular input storage flip-flop is scanned and is found to contain a bit of information, that bit is retained in the buffer 27 while it is recorded in the three words for short term, hourly, and day on its respective portion of the track on disk 50. The storage flip-flop 14 is reset sixteen bits after it has been scanned and found to contain a "1" bit and hence made ready for a new input. The "0" or "1," as the case may be, is stored in buffer 27 for the three words.

Accordingly, it will be seen that through this arrangement the incoming lines 2 are scanned in effect by interrogating the line storage flip-flops 14 in sequence at a rapid rate. Only the last bit of information received is used; and, if a bit of information is stored in an input line of flip-flop 14, it is passed through the selector switch 16 and the gates 25 and 26 and buffer 27 through lead 51 to the serial half-adder 52. This data is passed through, in effect, three times, once for each of the three words on the track.

Storage

Each word on the recording tracks 58, 60 and 62 of disk 50 is composed of 24 bits. This provides for a record of five digits per word for each station, the digits being the counting digits. A binary coded decimal (BCD) system is used, which means that each character or digit requires four bits. There are, in addition, four spare bits in each word as the unit is designed so that each word consists of five times four bits plus four spare bits or a otal of 24 bits. The count for each counting station or ocation is recorded three times in the form of three totals, i.e., short term, hourly and daily, one right after another. Thus, each station requires three 24 bit words. Each track is capable of receiving 1,440 bits, which therefore is equivalent to 60 words (or sectors) which means 20 counting stations. Thus, for 60 stations, three tracks, 58, 60, and 62 are needed for recording purposes.

Storage disk 50 has readheads 70, 72, and 74 associated with tracks 58, 60 and 62 respectively. In addition, it has write-heads 80, 82 and 84 associated with the same tracks in the same order. The readheads 70, 72 and 74 are connected to head switch 76 which determines which of the three readheads is activated at a given time. Head switch 76 is controlled by revolution counter 32 through line 77, representing three leads for the three revolutions. The write-heads 80, 82, and 84 are similarly controlled by head switch 86, actuated by revolution counter 32 through gate matrix 87, which causes the write-heads to be two words behind the readheads.

The output from head switch 76 passes via a read amplifier 75 and through lead 78 into the two serial half-adders 52 and thence through lead 79 to 49-bit serial shift register 100. The data in the shift register may then pass through lead 102 to normally open control gate 104 and thence back through lead 105 to head switch 86 via a write amplifier or may pass through lead 107 to normally closed control gate 110.

In operation, then, the data from the particular input line 2 in question, in the form of a bit, if any, on its associated storage flip-flop 14, is selected and passed to half-adder 52. Synchronized with that selection is a read-out from the related read-head 70, 72 or 74 of the total count in BCD form previously stored there for that channel. The word pickup from that channel passes through lead 78 into half-adder 52. If there is a bit in half-adder 52 from the intermediate buffer flip-flop 27 to be added, it is added to the least significant bit from the word received through line 78 for each of the three totals for that input. If not, there is no addition. In either event, the word then passes through lead 79 through shift register 100, lead 102, control gate 104, lead 105, head switch 76 and the respective write-head 80, 82 or 84 for recording again on disk 50 in the same position from which it was previously read out.

*Readout*

When it is desired to print out the traffic count for all stations, either by manual actuation or by command from the digital clock, the gate matrix 130, via line 131, closes control gate 104 and opens control gate 110, one word at a time. As mentioned above, however control gate 104 is normally open, so that data on shift register 100 is returned to disk 50 through the head switch 86 and the write-heads 80, 82 and 84. Upon signal via line 131 from gate matrix 130, however, control gate 104 will close and control gate 110 will open for the duration of a single word. Thus, there will be no writing back on the storage disk 50 of that word, and, in effect, the storage disk will be erased for that word so that a new count can start. The other two words for the detection station will not be affected. At the same sime, the word in register 100 will pass through control gate 110 to shift register 112. Shift register 112 holds the word long enough for the print out below described.

It is necessary that two initial functions be performed. The information in the particular location for that data on the disk 50 is entered on the 24-bit shift register 112 for storage until fully processed and punched out. This is necessary since the punching out time requirement is much greater than the time that the information remains stored in the 49-bit register 100. In addition, the information to be printed out must be inhibited from being written on the memory disk. It is via the readout control that these two functions are taken care of. To enter the information into the single word buffer 112, control gate 110 is opened up at the same time control gate 104 for the write-heads 80, 82, and 84 is closed. The readout control signal is the result of coincidence in NOR gate 142 associated with line comparator 136 and word comparator 134. The resultant signal, i.e., the coincidence signal, passes through the gate matrix 130 and becomes the readout control signal for the two control gates just mentioned.

Gate matrix 130 closes control gate 104 and opens control gate 110 by line 131 for a one word duration, one word at a time.

The second function, i.e., the inhibition of printed out information from being written back into memory disk 50 is accomplished by closing the normally opened control gate 104. Once again, this is done by means of the readout control signal.

Gate matrix 130 is timed from word comparator 134 and line comparator 136, via NOR gate 142. Word comparator 134 for its part receives data from word counter 34 through lead 135 showing what word is at that time passing through the shift register 100, and also receives data from three bit register 139, through line 137, which represents three leads. Three bit register 139 indicates through data received via gate matrix 292 and line 179 from the digital clock of FIG. 5 to be described below, whether day (D), hour (H), or short term (S) readout is required by making a corresponding one of the three leads 137 positive, for example, this serving as a "D.H.S." three-bit register. The output of word comparator 134 passes through lead 140 to NOR gate 142 and thus through lead 132 to gate matrix 130. A signal appears on line 140 when the word on the recording track for any station is the same as the signal word, i.e., day, hour or short term, from three bit register 139 through line 137. Line comparator 136 has as its input a pulse from line counter 30 and a pulse from input line selector 150 which is in turn connected to gate matrix 130 through lead 151. Line comparator 136 compares the section of the storage disk track that is actually passing the applicable write head, with the section desired as indicated through the input line selector 150 and provides an output signal on line 152 to NOR gate 142 (serving as an AND gate) when the two are in coincidence. Thus, gate matrix 130 will receive the input siganl from NOR gate 142 only when the latter is receiving signals from word comparator 134 and line comparator 136.

Accordingly, when readout control line 131 is actuated, the recorded count for the particular desired word on the storage disk passes into the 24-bit shift register 112 instead of being returned to the storage disk. Shift register 112 holds the word long enough to be punched out on paper tape shown in FIG. 3.

*Tape punching*

The tape punching occurs in an eight channel tape punch 180. Associated with punch 180 are eight solenoid amplifiers 182 adapted to power the respective solenoids to punch the respective eight rows of the tape. These solenoid amplifiers represent from top to bottom in FIG. 4 the lines of FIG. 3 of "1," "2," "4," "8," parity check, "O," "X," end of line. A ninth amplifier (not shown) controls solenoids for sprocket hole punching and tape advance in the tape punch 180.

In connection with the discussion of FIGS. 2 and 3 above, the output data punched on the tape were classified as group "A," group "B," or group "C." It is, therefore, necessary to have a three digit ring counter, identified as 184, serving as a group selector, to control which of the three groups, at a given time, is to be punched on the tape. Ring counter 184 furnishes a signal on line 185 to letter generator 186 and via line 188 to gate matrix 190 for time of day and date, and through lead 192 to gate matrix 194 for traffic count. The gate matrix 194 for traffic count receives the actual traffic count from 24-bit shift register 112 through line 195. The gate matrix 190 receives its data from the digital clock still to be described and the letter generator 186 receives data as to the particular letter, D, H or S, through 3-bit shift register 139 and line 197.

Three-bit register 139 determines when the unit will print out; this occurs by a control signal from gate matrix 292 into register 139, gate matrix 292 being controlled by signals from the digital clock to be described below. During the time the print-out is to occur, a signal passes from register 139 through lead 187 into gate matrix 130. In the absence of such a signal, digital selector 200 does not receive an input on line 170 and so is inoperative.

The three-bit register is so designed as to require only one report to be punched out at any one time, in other words, daily, then hourly and then short term. It advances from daily to hourly, to short term until there is no report left to be punched out.

The nine digit ring counter 200 has output line 202 going to the end of line gate 203 and the lowest of the solenoid amplifiers. Output line 210 passes to gate matrix 194, gate matrix for station number 220 and gate matrix for time of day and date 190. Output line 215 passes from ring counter 200 to letter generator 186. The punches needed on the tape punch such as 1, 2, 4, 8, O, X, E.O.L. are produced by the letter generator 186 and the zero and parity generator 240. Letter generator 186 is a gate matrix which allows the proper code to go to the punch and is controlled by ring counters 184 and 200 and three-bit register 139.

In producing the punched tape, shown in FIG. 3, first of all the group "A" report must be generated. Accordingly, data comes from the three digit ring counter 184 through lead 185 defining the group. The nine digit ring counter 200 controls the sequence of characters in any given group by outputs 202, 210, and 215. Counter 139 controls whether it is S, H, or D that is to be communicated to the punch. Accordingly, for the digit "5" position on the tape of FIG. 3, nine-digit counter 200 in association with three-bit register 139, and ring counter 184 provides for the issuance by letter generator 186 of an indication of which type of report is being written. Since the "end of line" occurs at the end of the ninth character, then on the ninth digit, as counted by the nine digit ring counter 200, a pulse is fed to the eight channel tape punch 180 through its solenoid amplifier directly through a gate. This information does not have to go through any of the gate matrixes or letter generators.

When group "B" is being punched out, the three digit ring counter 184 will send a signal to the gate matrix 190 and the time of day will then be recorded on punches via amplifiers 182. Comparably, signals will go to gate matrix 194 for group "C" when the actual traffic count is being punched out.

As has previously been discussed in connection with FIG. 2, each line on the final printed tape shown in FIG. 2 contains eight character positions per line, and an additional unit for "end of line." The so-called nine-digit ring counter 200 accomplishes this purpose.

Digit selector 200 is a nine-digit ring counter adapted to count the nine characters represented by any given horizontal line on the tape of FIG. 2 or, alternatively, nine consecutive lines on the punched tape of FIG. 3. Digit selector 200 has an input line 170 leading from gate matrix 130. The input on line 170 is a pulse for every character to be punched out and is obtained by gate matrix 130 through pulse timer 245 to be described below.

Digit selector 200 produces an output pulse for every ninth digit. This output pulse passes by line 172 into gate matrix 130; it also passes through line 202 to the end of line solenoid amplifier 182.

Group selector 184 receives a clock input pulse through line 174 from gate matrix 130. Group selector 184 has a three-line output line 176 feeding to gate matrix 130. During periods of punch-out one of these three lines is always actuated and represents a particular group being punched out, i.e., group "A," group "B" or group "C."

Gate matrix 130, as previously mentioned, receives an input from digit selector 200 at the end of each nine digits and receives an input from group selector 184 on one of the three lines 176. Gate matrix 130 produces an output pulse on line 174 leading into group selector 184 every nine digits during groups "A" and "B" and at the ninth digit of the sixtieth channel input line during group "C." The latter signal on the end of the ninth digit of the sixtieth station results from a signal from input line selector 150 through lead 146 to gate matrix 130.

Located above ring counter 200 is pulse timer 245 which receives pulses from gate matrix 61 through lead 246 when the last flip-flop of the 24-bit counter 36 resets to zero. Pulse timer 245 is a binary counter which counts down the frequency of these pulses so that a frequency is obtained which will be within exact speed for the punch to use during its punching operation. The pulses coming out of this pulse timer 245 are fed into the nine-digit ring counter 200 through gate matrix 130 as described above. These same pulses are fed through lead 247 to gate matrix 194, gate matrix 220 and gate matrix 190.

As discussed above, control gate 110 for 24-bit shift register 112 is actuated through line 131, leading from gate matrix 130. In the event all of the information of the particular word has not reached the 24-bit shift register 112 prior to actuation of digit selector 200 an error could be introduced in the punched out record. Accordingly, the initial clock pulse on lead 170 to digit selector 200 during the print out of group "C" does not occur until the end of the pulse received by gate matrix 130 on line 132 from NOR gate 142 previously described. The length of the pulse on input line 132 is the same as the length of pulse required to read the entire word into 24-bit shift register 112.

The digital clock to be described below produces signals on one or more of the three input lines to gate matrix 292, depending upon whether there is to be a short term report, a short term and hourly report, or a short term, hourly and daily report. At the time of punch-out, the change-of-day input to gate matrix 292 is first applied to three-bit register 139 if there is such, input, otherwise, the hour, if such and otherwise short term. The group selector 184 first causes the daily report to be punched out. At the end of the ninth digit of the sixtieth station a signal passes from gate matrix 130 through lead 178 to three-bit register 139, causing it to then receive the lower time period input.

VISUAL DISPLAY

On occasion it is desirable to have a visual display of particular readings for particular traffic channels. This may be had through display matrix 166. Associated with display matrix 166 is control unit 160, which receives synchronizing signals through lead 162 from gate 142 and through lead 164 from line counter 30. Control gate 160 is adapted to be set for the particular input traffic channel 2 desired and for the period desired, that is, short term, hourly or daily. This control then sends a signal through lead 163 to input line selector 150 so that the necessary selection signals will be provided through gate matrix 130 and all of the associated circuitry.

Accordingly, control gate 160 then provides through lead 165, passing to control gate 110, for the signal that is passing through the 49-bit shift register 100 and thence back to the disk for storage, as previously discussed, to also pass through control gate 110 and the circuitry of 24-bit shift register 112 and via line 168 into a display matrix 166 where a read-out of traffic count may be displayed.

This read-out through display matrix 166 in no way interferes with the normal operation of the storage disk. The read-heads read back through the write-heads or punch-out on occasion, except that the display head 166 may not be used during the specific time period when a periodic punch-out is taking place through paper tape punch 180.

DIGITAL CLOCK

Turning to FIG. 5, there is shown a digital clock block diagram. This digital clock operates on the basis of the timing of an ordinary sixty cycle per second input 270. The input goes through a Schmitt trigger 272 and then through a modulo 3600 counter 274 to break it down so that intervals of one minute are obtained. Further multiples such as five minutes, six minutes, ten minutes, twelve minutes, fifteen minutes, twenty minutes and thirty minutes as well as the hours of the day and the days of the year up to 365 can then be obtained. These various periods are obtained through circuits arranged in sequence with one another following counter 274.

Thus, the output of modulo counter 274 passes through lead 275 to predetermined counter 276 which can indicate change of short term, i.e., any of the multiples above up to thirty minutes, and the output of counter 274 also passes into minutes counter 277. Tens of minute counter 278, hours counter 279, tens of hours counter 280, day counter 281, tens of days counter 282 and hundreds of days counter 283 are cascaded sequentially from the output of minute counter 277. The output of predetermined counter 276 on line 285 is used for change of short term indication. The output of tens of minutes counter 278 on line 286 is used for change of hour and the output of tens of hours counter 280 together with the output of the hours counter 279 via gate 293 is used for change of day at 24 hours, on line 287. The output of each of the counters 277 through 283 may be led to a gate matrix 290 which will drive display indicators 291 for the number of the day, the hour in the day, and the minute in the day, so that a visual readout of the time is available through this unit.

The clock pulses received from the outer two tracks of disk 50 produce control pulses A, B and C as shown in FIG. 6. These pulses are used in the various circuit diagrams in discussion for control purposes and serve to synchronize the actuation of all of the various units.

Turning to the three-bit shift register 139, previously referred to, in FIG. 4, there are shown three inputs to a gate matrix 292 that feeds into the register 139. These inputs are the outputs 285, 286 and 287, for change of short term, change of hour and change of day from the digital clock described with reference to FIG. 5. These are fed into matrix 292 and so enable shift register 139 to generate the signals for initiating read-out via lines 137 and 187 into gate matrix 130 for controlling letter generator 186 for the daily, hourly and short term designations or code words for the reports.

In addition to the signals via lines 295 necessary for the display of the day, hours and minutes through gate matrix 290, the same information must be used for printout in the group A and in group B portions of the report. Accordingly, this information from the digital clock of FIG. 5 from lines 295 is fed to gate matrix 190 in FIG. 4. For convenience these lines 295 are presented as line 294 passing from gate matrix 290 to gate matrix 190 in FIG. 4.

CIRCUITRY

Bit counter and gate matrix

FIG. 7 shows the portions of FIG. 4 identified as bit counter 36 and portions of gate matrix 61. The inputs to the 24-bit counter come from clock sector lead 57 and clock "A" on lead 28 for reset and from clock B (from line 43) into flip-flop 320 for bit counting.

Associated with the output of gate 302 is a bit counter circuit composed of flip-flops 320, 322, 324, 326 and 328 connected in cascade as a counter. The output of gate 302 passes to the reset side of bit counter 320 and to the set side of the remaining flip-flops. The input of flip-flop 320 receives clock "B" pulses through lead 43, or derived by phase delay from the clock "A" pulses on lead 43.

The "0" output of flip-flop 320 is fed to the trigger of flip-flop 322; and the "0" output of flip-flop 322 is fed to the trigger of flip-flop 324 etc. through flip-flop 328. Output lines are also present with line 332 indicating "1," line 333 indicating "not 1," line 334 indicating "not 2," line 335 indicating "not 4," line 336 indicating "not 8" and line 337 indicating "not 16."

As previously mentioned, the output of the 24 bit counter is used for controlling the half-adder 52; thus leads 332 and 333 are fed to NOR gate 340 to produce an output on lead 342 of "not 1" and "not 2." NOR gate 346 receives the output from gate 340 together with "not 4," "not 8," and "not 16" on lines 335, 336, and 337, respectively, to produce a signal on lead 347 at the beginning of each word. This signal is used in half-adder 52 and pulse timer 245. NOR gate 350 has input from leads 332, 334, 335, and 336 and produces an output on lead 351, for the second and seventeenth bit of each word which is used to feed gate 354 and, in conjunction with gate 31 to reset storage flip-flop 14 on the seventeenth bit of the third word for each input channel scanned. NOR gate 354 receives the output of gate 350, the "not 16" output of flip-flop 328 and a third word signal on line 353 to produce bit 2 of the third word. In addition, flip-flop 328 through output lead 337 also produces a pulse in line 337 for word advance in word counter 34.

The output of gate 354 leads through line 352 to an inverting amplifier and thence to output line 47. As will be described below, lead 47 serves to scan gates 25 and 26 in the output circuitry of gate matrix 16.

Gate 356 is adapted to receive inputs from clock B on lead 43, a signal for the first revolution on lead 37 and an index signal on lead 63; thus gate 356 produces an output pulse at the first bit of the first word of the first turn of the first track on disk 50, that is, the first turn of track 70. The output of gate 356 then passes to the "set" position in flip-flop 358. The output of gate 354 previously mentioned passes through lead 352 to the "reset" position of flip-flop 358; thus flip-flop 358 is in the "set" position from the time of the signal from gate 356 to the second bit of the third word. During the period flip-flop 358 is in the "set" position, a signal then enters gate 366 through lead 359. Also as inputs to NOR gate 366 are signals on lead 353 and lead 347 previously discussed. An output of this gate on lead 35 resets the line counter 30.

NOR gate 360 has an input on lead 338 from the "16" set side of flip-flop 328. It also has an input on lead 349 from word counter 34, representing the duration of the second word of each three-word group. The output of gate 360 is on lead 42 and serves as a line advance for input line counter 30.

Gate 31 has been previously discussed in connection with FIG. 4. It is shown here as receiving an input for the seventeenth bit of the third word on lead 351, on lead 353 for the third word coming from the word counter 34, a set position signal on lead 51 from buffer 27 and a signal for 16-count on lead 338 of flip-flop 328. The output from gate 31 is the reset signal for the various flip-flops 14 and is on lead 33.

Input and scanning circuits

FIG. 8 shows the input and scanning circuits, i.e., it shows the equivalent of the input lines 2, the line filters 10, the storage filters 14, and, in particular, the gate matrix switch 16 of FIG. 4. The left-hand portion of the figure is line counter 30; the right-hand, gate matrix 16. Since there are provisions for sixty line inputs 2 and the circuitry is, in effect, repetitive, only a portion of the circuit is disclosed in FIG. 8. In the upper right-hand portion of input of FIG. 8 are shown three input circuits for input line 00, input line 01, and input line 02. These lines are shown as 2A, 2B, and 2C, respectively. Line 2A feeds into line filter and pulse former 10, marked 500. Line 2B feeds into the same type of "L.F." 10, marked 502; and line 2C into 504. The output of each of these is handled in a similar fashion, and so but one needs to be described. Considering the 00 input line, the formed output is fed into storage flip-flop 14A through lead 12A. The output thereof passes through lead 18A and NOR gates 515 and 516.

NOR gate 516 has as inputs not only the output from flip-flop circuit 14A, but also line unit counter input 520, decade counter line 522 and a line 18A from flip-flop 14A.

Associated with these input circuits are line counters identified by NOR gates 530 through 539, which are connected to line counter circuitry such that they produce outputs only for the particular number 0 through 9, respectively, i.e., gate 530 produces an output only for pulse number 0 which goes into line 520. Gate 531 produces an output only for unit pulses and passes through line 545 into the input of the output gate circuitry associated with input line 01. Gate 532 produces an output only for pulse 2 which is used for the input line 02, etc.

The second series of line counters is represented by the NOR gates 550 through 555. These deal with the tens count, i.e, 0, if the ten count gate 550 gives an output; if it is 10, gate 551; 20, gate 552, etc., through 555. The output of 550 passes through line 522 to the input of gates 515 and 516 associated with input line 2A.

The input to the two groups of line counter gates 530 through 539 and 550 through 555 is through the usual type of line counter flip-flop shown in the left portion of FIG. 8. This is made up of seven flip-flops numbered 560 through 566, respectively, which have a trigger input on line 42.

Flip-flop 560 can have either a "1" or a "not 1" position. The output of a "not 1" position is fed into the trigger input of flip-flop 561, which has either a "2" or a "not 2" position. The output from 561 is fed into 562, which can have either a "4" or a "not 4" position, etc., the entire group being connected in cascade as a counter. Accordingly, the output lines from these flip-flops labeled 571, 572, 573, 574, 575, 576, 577 and 578, represent counts respectively of "1," "not 1," "2," "not 2," "4," "not 4," "8," and "not 8." These outputs feed into the line counters gates 530 through 539, respectively, in the proper count to produce an output for the desired number. Thus, for example, line counter gate 530 has an input of "not 1," "not 2," "not 4," and "not 8." On the other hand, line counter gate 533, producing an output for the count of 3, would have an input from the lines 571, 573, 576 and 578 representing counts of "1," "2" "not 4," and "not 8" respectively. In addition, the counter circuitry has gate 580, which has inputs from the flip-flops 560 through 563 of "not 1," "2," "not 4," and "8." Accordingly, an output signal is obtained for every ten count. This output, then is fed through monostable multivibrator 581 and OR gate 582 to the input of previously mentioned flip-flop 563. OR gate 582 also produces a pulse when a program reset pulse is coded through. A pulse through the input of OR gate 582 feeds into the "not 8" side of flip-flop 563, and the "not side" of flip-flops 560, 561, 562 for resetting purposes. The output of 563 of "not 8" feeds into trigger input of flip-flop 564, thus giving a reading of alternatively "10" and "not 10." Flip-flop 564 feeds to the trigger of flip-flop 565 and then to flip-flop 566 in cascade as a counter, so that the output of these last three named flip-flops is "10," "not 10," "20," "not 20," "40," and "not 40" on lines 585, 586, 587, 588, 589, and 590, respectively.

These outputs last named are then applied to previously mentioned gate circuits 550 through 555 in a manner to produce an output on 550 when there are no tens, on 551 when there is one ten, etc., so that there are outputs for "00," "10," "20." "30," "40," and "50."

Shown in the drawing to the extent that this gate matrix circuit has been fully drawn here, it can be seen that the output of gate 550 for "00" reading leads through line 522 into the inputs of the gate circuits associated with input lines 2A, 2B and 2C, just as the unit counters also led into those lines. It can, therefore, be seen that gates 515 and 516 can only be actuated on a count of "00"; the gates associated with input 2B, only with a count of "01"; the gates associated with 2C, only with a count of "02," etc.

If we assume that there is an input to line 2A produced by traffic actuation at the local detector unit, this will cause an output on line 12A into flip-flop 14A. It will also produce an input into gate 516. Since gate 516 is also controlled by the ones, the tens, and the storage flip-flop of 510 output, all of these must also be activated to produce an output on line 595 leading from gate 516. Flip-flop 14A is a storage flip-flop and holds the one bit of information from the detector until there has been a reading through line 595 and the reset has been actuated through line 33. Line 33 has been previously mentioned as the line leading from NOR gate 31 in FIG. 4 for the purposes of resetting the storage flip-flops. It will be seen that when line 33 is actuated, this allows for an output from gate 515 which then resets storage flip-flop 14A until there is another input pulse on line 2A.

As has been previously mentioned, the output of the gate matrix 16 for whichever input line is being viewed at a given instant feeds into amplifier 24 represented by NOR gate 24 in FIG. 8. This NOR gate shows several inputs, one of which could be representative of line 595 from NOR gate 516. The output of gate 24 leads through line 602 to NOR gate 25. Also supplied to NOR gate 25 are clock pulses "C" and a signal on line 47 for the second bit of the third word for such channel. The output of NOR gate 25 feeds into buffer flip-flop 27 and thence to the half-adder circuitry 52. Buffer 27 stores the output bit from whichever input channel that is then being scanned for a three-word time period so that the bit may be added to the three tallies for short term, hour, and day.

*Head switches*

FIG. 9 shows the circuitry for the head switches associated with the readheads 70, 72, and 74 associated with disk 50. These readheads have playback lines 610 and 612 associated with them. The heads themselves are operative, however, only when actuated by their respective lines 614, 616, and 618. The control of these lines for the readheads comes through an indexing pulse from the fourth track of the "Bernoulli Disk" 50, identified as clock index track 56, line 63. This index feeds the trigger input of a flip-flop circuit 620, the "set" output of which leads to NOR gate 622 and the "reset" output of which leads to NOR gates 624 and 626. The "reset" position of flip-flop 620 also leads to the trigger input of flip-flop 628. The "set" output of flip-flop 628 feeds gate 626 and the "reset" output feeds gates 622 and 624. Thus, gate 624 is "on" when both flip-flops are in "reset" position. 622 is "on" when flip-flop 620 is "set" and the other "reset." Gate 626 is "on" when flip-flop 628 is "set" and 620 is "reset." Thus, it can be seen that only one of the three readheads is operative at a given time and the one operative is controlled by the index pulse on line 63. Flip-flops 620 and 628 are adapted to be reset at the end of every third turn. The output on leads 610 and 612 passes through read amplifier 75 to leads 78.

*Adder*

The adder circuit is shown in FIG. 10 and corresponds to the block 52 in FIG. 4.

The circuit has inputs via lines 51 from the buffer 27 and via lines 78 from the read amplifier 75, and also has the following inputs from gate matrix 61 for timing an input via line 342 for every fourth bit, an input via line 347 for the first bit of any given word, and the "clock" pulse inputs via lines clock "A" and clock "C."

For decimal correction control, the following inputs are fed into the adder: lines 81 provide input from shift register 100 to NOR gate 654, which monitors the first four flip-flops of this 49-bit shift register 100 and line 81 in the block diagram of FIG. 4 also represents an additional line 649 (FIG. 10) from shift register 100 to the adder 52, monitoring the fourth flip-flop of the shift register.

The adder 52 has several outputs in the upper left-hand part of FIG. 10 and in the lower right-hand part of FIG. 10, as follows, represented as a group by line 79 in FIG. 4.

In this group, there are two output lines 676 in the upper left-hand part of FIG. 10, feeding through resistors to the proper steering diodes in the fifth flip-flop of the shift register 100, to repeat the information monitored by NOR gate 650 from the fourth flip-flop of the shift register 100. The "set" line 678 and "reset" line 679 at the lower right in FIG. 10 also are part of the output line group 79 to set or reset the first flip-flop stage of the 49-bit shift register 100 respectively as determined by the addition of any new bit stored in buffer 27 to the corresponding least significant bit (LSB) being read out from the storage disk 50, the bit in buffer 27 representing a new traffic pulse, or traffic increment pulse from the input line storage being scanned, and the LSB being read out from the storage disk being that previously stored for the corresponding input line.

The following is a description of the adder circuit of FIG. 10, starting with the first bit, for example.

The adder receives timing information from gate matrix 51 as to the first bit through line 347. It also receives the inverted signal of 347, i.e., not B1 or B1 with a bar line over it. During bit "one," either one of the following can happen. If none of the data inputs to the adder is "on," (the input circuit levels being "down" for "on" in the NOR used as AND logic in this case) or, in other words, the buffer 27 and line 51 are "up" (i.e., have a "zero"), there is a "zero" read from the read amplifier through 78 and there are no carries, then a "zero" or "up" output will be formed by NOR gate 656. This will then feed through OR gate 663 through line 679 into the first flip-flop of shift register 100.

If, however, a "one" (i.e., a "down" level) feeds through line 51 from the buffer 27, and a "one" (i.e., a "down" level on line 78) is read from the read amplifier 75 through line 78, then NOR gate 657 forms an "up" pulse which also feeds through OR gate 663 via line 679 of the line group 79 into the reset input of the first flip-flop of the shift register. When the buffer only reads out a "one" and there is no "one" read through the read amplifier, then NOR gate 659 forms an "up" pulse which feeds through OR gate 665 via line 678 of line group 79 into the "set" input of the first flip-flop of the shift register to set it to "one."

If the read amplifier only reads a "one" and not the buffer, then NOR gate 661 forms a pulse which flows through OR gate 666 into the "set" input of the first flip-flop of the shift register.

Summarizing, one can say that the following gates only work on the first bit: 657, 659 and 661. Gate 656 works on any bit. The following gates work only on "not bit one" (B1 with a line over it). These are 658, 660 and 662. It can be seen, therefore, that no carries are allowed on bit one.

Gate 656 puts out a pulse which resets the flip-flop of the shift register if there is no input on either carry or the read amplifier. Gate 658 forms a pulse which on the one hand sets the carry flip-flop 669 through OR gate 664 and pulse-delay 667 and on the other hand through OR gate 663 resets the first flip-flop of the shift register. Gate 658 forms a pulse when there has been a carry and a "one" read from the read amplifier. Pulse-delay 667 comprises, for example, two one shot multivibrators in tandem, the first serving as a delay multivibrator to delay the start of the second, and the second serving to time the output pulse length. Gate 660 forms a pulse when there is a carry only and it, in turn, resets the carry flip-flops 669 and sets the first flip-flop of the register via OR gate 665. Gate 662 forms a pulse if there is a "one" from the read amplifier only and it also resets flip-flop 669 through OR gate 666 and pulse delay 668 similar to 667 and also sets the first flip-flop of the shift register 100.

It can be seen that gates 657 and 658 operate when there is a carry and gates 659 and 660, 661 and 662 operate when there is no carry, just a "one." Therefore, it could be said that gates 665 and 661 and 660 and 662 form exclusive OR's with OR gate 665. Gates 657 and 658 form the carries, gates 659 and 661 together with gates 665 and 666 form one exclusive OR, and gates 660 and 662 together with gates 665 and 666 form the other exclusive OR of the adder.

The circuit described up to now only performs addition in the binary system. Therefore, it is necessary to make a correction to bring the information to binary coded decimal (BCD). This is done by the circuitry on the left-hand side of FIG. 10.

NOR gate 654 always monitors the first four flip-flops of the shift register 100 through the leads represented by 81 and on every fourth bit this information is read-out through NOR gate 671 and NOR gates 652 and 653 to see if the resulting number is a "10." In that case, a carry called "decimal carry" is fed to NOR gate 672 and OR gate 673, which in turn feed the adder, and allow it to perform binary addition on the first bit of the next BCD character. Since pure binary addition, however, would continue from "10" through "11" through "16," a correction has to be made. This is done by the NOR gates 653, 652, flip-flop 670, NOR gate 650 and inverter 651.

Normally, NOR gate 650 monitors the fourth flip-flop of the shift register and puts out voltage levels at its output and the output of 651 to have the fifth flip-flop repeat the information of the fourth flip-flop. If, however, there is a decimal carry, NOR gate 653 will turn off gate 650 by setting flip-flop 670. It then will inhibit gate 650 until NOR gate 652 resets flip-flop 670, which is done at the end of every third bit in a four-bit group. It can be seen, therefore, that the flip-flop 670 will inhibit the bits written into the shift register for four consecutive bits. The binary addition is allowed to go on as usual, taking the decimal carry into account.

Gate matrixes 130 and 292

Figure 11:
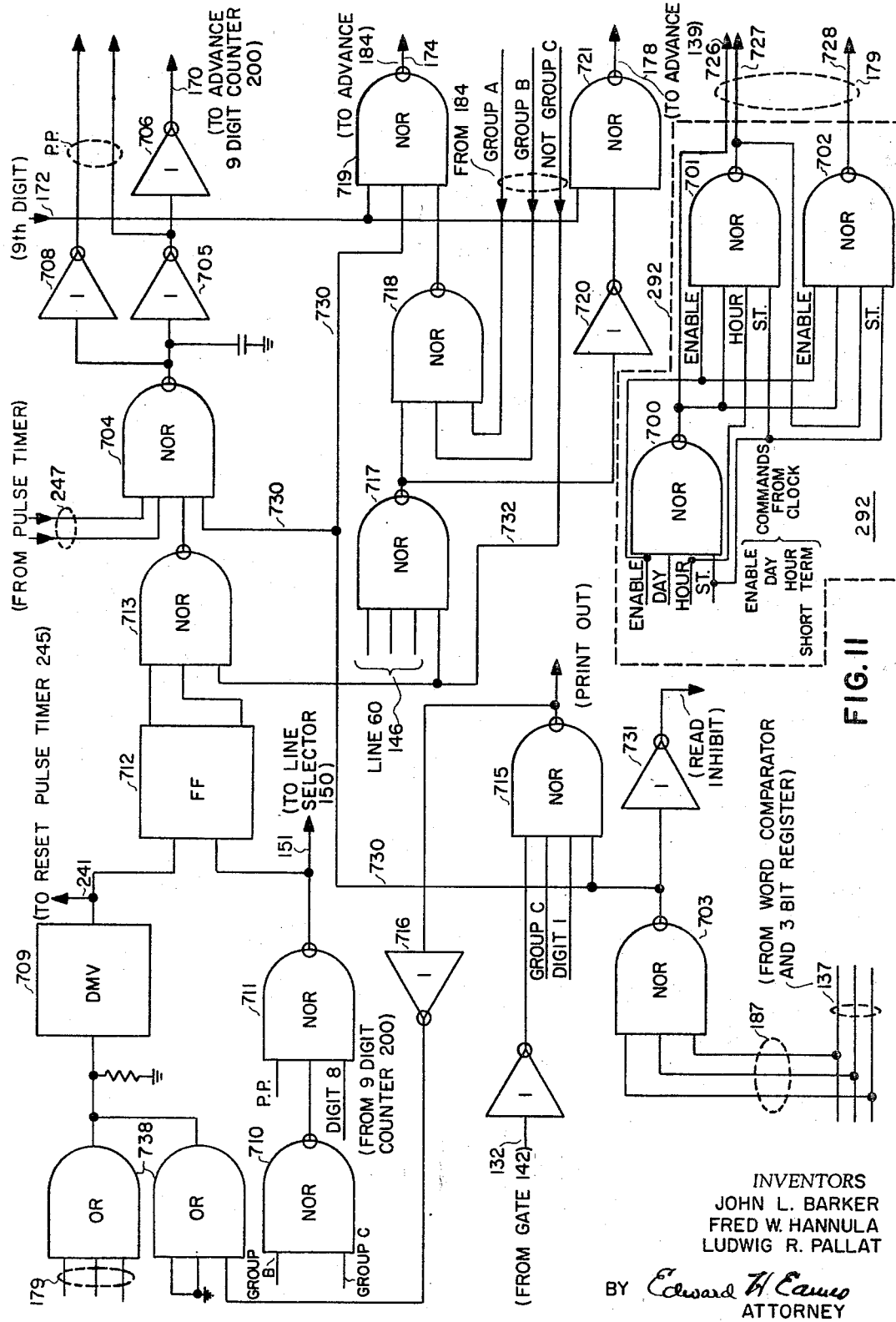
FIG. 11 is a circuit diagram of the gate matrix used to control print-out.

FIG. 11 is a circuit diagram for the gate matrix 130 which controls the printout on punched tape of the information stored in the system. The gate matrix 130 is shown on the major part of FIG. 11. Gate matrix 292 is shown blocked-off separately by broken line in the lower right-hand part of FIG. 11. These gate matrixes correspond with the similarly numbered blocks in the block diagram of FIG. 4.

Starting with the circuit of the gate matrix 292 in FIG. 11, which consists of the gates 700, 701 and 702, and the related interconnecting circuitry, the inputs to this matrix 292 are shown entering the block at the left into NOR gate 700 and the outputs are shown as a group of three wires, 726, 727 and 728, corresponding to line 179 of the block diagram of FIG. 4, at the right side of the FIG. 10.

Commands enter the NOR gates 700, 701 and 702 from the digital clock. The input labeled "ENABLE" shown at the top is normally "on" by being grounded continuously from a main switch control, for example, during the operation of the unit.

If all three of the commands from the clock on inputs "DAY," "HOUR" and "SHORT TERM" (which latter is sometimes designated "S.T.") appear simultaneously, the NOR gate 700 forms a pulse on line 726 to set the appropriate flip-flop, for the "DAY" report, in the three-bit register 139, shown in block form in FIG. 4. The output of NOR gate 700 on line 726 also inhibits the NOR gates 701 and 702.

Similarly, if there is an "HOUR" command and "SHORT TERM" command only in combination, there will be no output on line 726 from NOR gate 700, but NOR gate 701 will provide an output on line 727 to set the "HOUR" flip-flop in the three-bit register 139.

When there is only a "SHORT TERM" input command from the clock, only the NOR gate 702 is operated to provide an output on line 728 to set the "SHORT TERM" flip-flop in the three-bit register 139.

Now turning to the gate matrix 130 circuitry as shown in the remainder of FIG. 11, a positive input from the three-bit register 139 appears on lines 137 and 187 into NOR gate 703, in the lower left-hand part of the figure.

NOR gate 703, therefore, is closed and feeds a "down" signal to NOR gate 704 via line 730. NOR gate 704 receives timing pulses via lines 247 from pulse timer 245 of FIG. 4. If line 730 is grounded by NOR gate 703 output, then NOR gate 704 provides an output via inverting amplifiers 705 and 706 to line 170, to advance digit counter 290 (shown on FIG. 4).

NOR gate 704 provides an output via amplifiers 708 and 705 via lines designated P.P. to provide strobe pulses for the output gate matrixes 190, 194 and 220 to control the printing-out of desired information.

Repeated input pulses on lines 247 into NOR gate 704 continue to advance the nine-digit ring counter comprising digit selector 200 up to the ninth digit, at which point a "down level" pulse also appears on line 172 from the ninth digit from digit selector 200, and this pulse on line 172 provides an input to NOR gate 719 which then produces an output on its line 174 to advance group selector 184 to change from A group to B group.

Similarly, after nine more pulses on line 247 with the ninth pulse also appearing on line 172, the NOR gate 719 is again operated to advance the group selector 184 from group B to group C at which time NOR gate 704 is inhibited via NOR gate 713, the NOR gate 713 receiving its input for this purpose from the line 732 from the "NOT GROUP C" input from group selector 184.

This input from group selector 184 via line 732 also acts on NOR gate 717 to provide an output from NOR gate 718 to inhibit NOR gate 719.

The apparatus remains in this condition, i.e., the first digit of the C group, until the correct selection pulse arrives on line 132 at the left-hand side of FIG. 11 from gate 142, shown in FIG. 4. Gate 142, as previously described, provides an output on line 132 if the word selector corresponds with the word passing under the write-head.

At the termination of the pulse on line 132, the NOR gate 715 cuts off its output via inverter 716 into the lower of the two "OR" gates 738, which in turn pulses the delay multivibrator (DMV) 709 to set the flip-flop 712 to inhibit NOR gate 713, which opens NOR gate 704. Such opening of NOR gate 704 allows the next series of nine pulses to go through NOR gate 704 and pulse amplifiers 708 and 705 as before.

The flip-flop 712 is reset at digit "8" by means of gates 710 and 711 in either group B or C to open gate 713. The output of gate 711 also serves to advance the line selector 150 via line 151. The NOR gate 710 opens gate 711 by means of a positive input from either the B group or C group flip-flop of the three-bit register 184, the NOR gate 711 then providing a positive reset input to flip-flop 712.

This routine provides a series of nine pulses for the nine successive characters on nine successive lines of the punched tape which correspond with one line on the "hard copy" to be produced by "Flexowriter" automatic typewriter action, for example. This routine of nine pulses is repeated sixty times, once for each of the sixty stations or input lines 2 in the system. At the end of the sixtieth nine-pulse series in such routine, NOR gate 717 opens by input control on lines 146 from input line selector 150, when the latter has reached input line 60. NOR gate 717 then opens NOR gate 719 by way of NOR gate 718, which provides an output on line 174 to allow the group selector 184 to return to the A group, and also NOR gate 717 provides an output via inverter 720 to NOR gate 721 to provide an output on line 178 to advance the three-bit register 139 to the next report of the series "DAY," "HOUR" and "SHORT TERM."

The procedure described above is repeated, in general, for the "HOUR" report and then the operation proceeds to the "SHORT TERM" report. At the end of the "S.T." report, the three-bit register 139 is empty or reset by its action as a shift-register.

Thus, at this time there are no inputs on line 137 or 187 and the NOR gate 703 is closed to cut off NOR gate 704 and thus prevent further digits or characters being printed out.

To prevent partial pulses from going to the gate matrixes 190, 194 and 220 via the lines P.P., any output on any of the lines 179 from the gate matrix 292 will reset the pulse timer 245 by action of delay multivibrator 709 through OR gate 738, which has the lines 179 as input.

It will be noted that the NOR gates function as AND gates since the clock pulses from the track on the disk are inverted to negative going to "down" or ground condition, for example, and other pulse outputs are inverted where necessary to provide an "up" output from the NOR gate when all inputs are "down." Then where a combination of "down" inputs at a next following NOR gate is desired to serve the "AND" function, the output of the preceding NOR gate is inverted to "down" before passing such output to the input of such following NOR gate.

The "NOR" circuit, used as a logic building block in this apparatus, operates as follows: It consists of two parts, a diode arrangement that passes a positive level with respect to ground, and an inverting single stage grounded emitter amplifier, which is either biased to cut-off or driven into saturation. If no diode is conducting, the transistor amplifier, which the diode gate drives, is biased to cut-off; hence the amplifier puts out a positive level. If any diode is conducting the proper amount of current, called one unit load, the transistor amplifier is driven into saturation, hence the output level is ground.

Therefore, the circuit acts as an "OR gate" if the desired output level is ground for any of the inputs being positive, and it acts as an "AND gate" if the desired output level is positive only for all of the inputs being "down" or at ground.

It will be appreciated that by employing additional tracks and additional similar circuitry for a six revolution cycle in place of the three revolution cycle described and illustrated, twice as many traffic stations and input lines, i.e., 120 input lines, could be accommodated. Also a more rapid rotation of the memory disk or other rotary multi-track magnetic storage element can permit a greater number of stations per track and increase the capacity.

Although the block 288 in FIG. 5 is identified as a manual selector for the desired number of minutes for the short term counting period by control of the predetermined counter 276, selecting the particular output desired from the predetermined counter, the selection may be made automatically by control of counter 276 by program from the digital clock to have the short term period set for different periods at different desired times during the day or for certain parts of certain days.

Although a preferred embodiment of the invention and some modifications thereof have been described or illustrated, for example, it will be appreciated that various further modifications or rearrangements may be made and changes in form, connections of the apparatus or substitution of components of the system may be made without departing from the spirit of the invention, within the scope of the appended claims.

We claim:

1. Apparatus for centralized accumulation of traffic flow data received from a plurality of dispersed detection tions, said apparatus including at each detection station means actuated by vehicles passing a detection station for generating said data in the form of binary bits, said apparatus including at a centralized location
- means for receiving said data on a plurality of input lines, individual ones of said input lines being coupled respectively to individual ones of said detection stations,
- input storage means associated with each of said input lines, each input storage means being coupled to its associated input line and adapted to store one bit of information,
- cyclic memory means having data word storage positions corresponding individually to the respective said detection stations,
- a least significant bit adder,
- a scanner adapted to receive sequentially and cyclically one bit of information at a time from each of said input storage means and to transmit same to said adder,
- said adder being adapted to receive a binary coded decimal figure from one of said storage positions of said memory means and to add said one bit of information to said figure as a binary coded decimal output, and
- said memory means being synchronized with said scanner to transmit said stored binary coded decimal figure to said adder and to receive said binary coded decimal output from said adder and to store same in a word in binary coded decimal form in a storage position corresponding to the detection station from which said bit was received.

2. The apparatus of claim 1, in which there are a plurality of said storage positions in said memory means for each of said detection stations, and said apparatus includes means to readout and to erase at different time periods the data in the respective plural storage positions of each said detection station within said memory means to provide totals for different time periods in the data stored in the respective positions for the same detection station.

3. An apparatus for centralized accumulation of data traffic flow at a plurality of dispersed detection stations, said data being in the form of bits represented by pulses having variable time spacing from vehicles actuating the detection station, said apparatus including
means actuated by passing vehicles at the detection station for generating said bits,
means for transmitting said bits to a centralized location,
  said transmitting means including
    input lines at said centralized location and individual to respective said stations for receiving said bits therefrom,
input storage means associated individually with each of said input lines for storing a bit of information therefrom,
an adder,
a scanner adapted to receive data sequentially and cyclically one bit at a time from each of said input storage means and to transmit same to said adder, said scanner being adapted to scan all of said input storage means in a complete cycle in a period less than that normally expected for said variable time spacing,
and cyclic memory means for storing data words in respective positions in a cycle, said memory means being coupled to said adder and synchronized with said scanner to receive a bit of information from said adder and to store same as an added bit in a data word comprising a cumulative total of bits in a storage position corresponding to the detection station from which said bit was received.

4. Apparatus as in claim 3 and in which said cyclic memory means includes timing pulses stored therein and said apparatus includes control means to receive said stored timing pulses for controlling the cycle of said scanning means and the coupling of said memory means to said adder to so synchronize said memory means.

5. Apparatus as in claim 3 in which said memory means includes
a rotating magnetic member with a plurality of storage tracks and
a plurality of read heads and write heads therefor, in which said stations are divided for storage into a plurality of groups and the information for the different groups is stored on different tracks with said read and write heads switched in sequence in successive revolutions for the respective tracks for the respective groups of stations in synchronization with the scanning of the input storage means for the respective groups, and said memory means includes
means for storing the information serially on the associated track for the stations within the group.

6. Apparatus as set forth in claim 3 in which
said memory means includes means to receive and store each bit from a particular detection station in a plurality of data words in a series of positions in said cycle of positions, and
said apparatus includes reset means synchronized with said memory means to reset said input storage means after the bit thereon has been stored in each of said plurality of data words for said particular station.

7. Apparatus as set forth in claim 6, including
means operating periodically at certain time periods to record the data stored in one data word of said plurality of data words in said memory means for each station and to reset said memory means to null for said one data word and
means operating periodically for different periods to record the data stored in another data word of said plurality of data words in said memory means for each station and to reset said memory means to null for said other data word.

8. Apparatus as in claim 6 and including
a digital clock providing three outputs at periodic intervals corresponding to days, hours and a short term period of a predetermined number of minutes, said memory means storing up-dated totalized data in said plurality of words serially for each of said three outputs for each of said detection stations,
and means controlled by respective of said three outputs for printing out and erasing from said data word storage said totalized data for the respective intervals for each of said detection stations.

9. Apparatus as in claim 8 and including means for variably selecting a desired number of minutes for said short term period for one said periodic output.

10. Apparatus at a centralized location for computing data on traffic flow at a plurality of dispersed locations including at said centralized location
input storage units individual to respective dispersed locations and adapted to receive one bit of information at a time from said respective dispersed locations and to store same,
cyclic memory means for storing in binary bit form a plurality of times in a plurality of positions the total information received from each of said dispersed locations,
means for scanning said input storage units sequentially to derive one bit of said information at a time therefrom,
means coupling said scanning means to said memory means to apply said derived bits for a particular dispersed location to said total information in each of said plurality of positions corresponding to that location to up-date the latter to give a plurality of totals for so storing in said memory means,
means for reading out the stored information in said memory means, a timer adapted to control said readout, said timer periodically causing at times said readout to erase the data stored in one of said plurality of positions for each of said dispersed locations and to record same, while not erasing or recording the data stored in another of said plurality of positions.

11. Apparatus as set forth in claim 10, having means to display the information stored in a selected one of said plurality of positions without erasing same.

12. Apparatus as set forth in claim 10, having secondary storage means for storing the data removed from any one of said plurality of positions during the period necessary for readout.

13. Apparatus for centralized accumulation of data on traffic flow received from a plurality of dispersed vehicle detection stations in the form of bits of information normally spaced one at a time from any one station, said apparatus including at a centralized location an input line for each detection station, input bi-stable storage means individual to each input line for storing in one of its bi-stable states one bit from said line, scanning means for interrogating in cyclic sequence the input bi-stable storage means for all of said lines, a least significant bit adder, said scanning means supplying to said adder a binary bit signal when said interrogated input storage means is in said one of its bi-stable states, magnetic memory means having a plurality of data storage positions for each of said input lines, means for periodically reading the data in each of said positions for each said line to supply said data from one such position one bit at a time to said adder, said adder adding to the data from each of said positions for each particular line the binary bit supplied from said scanning means for said particular line to provide an up-dated data output, write means to receive the output of said adder and store the same in the respective positions for each particular line, and means for synchronizing in predetermined time relation said scanning means and said reading and writing means for cyclically so up-dating said stored data through said adder in sequence for the respective lines for placing the stored data in up-dated form in the respective positions for the respective lines, and said apparatus including reset means controlled by said scanning means and said synchronizing means for resetting the respective said input storage means to its other bi-stable state upon the addition of the bit therefrom to the data from the plural positions for the associated line.

14. An apparatus as set forth in claim 13, having read-out means synchronized with said reading and adding means to periodically read-out the data on at least one of each of the memory positions for each input line and at the same time to prevent the re-storage of said data in said memory means.

15. An apparatus as set forth in claim 14, having visual display means synchronized with said reading and adding means to display the data stored in any one position in said memory means but without preventing restoring of said data in said position.

References Cited

UNITED STATES PATENTS

| | | |
|---|---|---|
| 2,910,238 | 10/1959 | Miles et al. |
| 3,029,414 | 4/1962 | Schrimpf _____ 340—172.5 |
| 3,061,192 | 10/1962 | Terzian. |
| 3,097,295 | 7/1963 | Williams. |
| 3,099,819 | 7/1963 | Barnes _____ 340—172.5 |
| 3,106,696 | 10/1963 | Foley _____ 340—154 |
| 3,114,891 | 12/1963 | Auer _____ 340—150 X |
| 3,181,121 | 4/1965 | Losch et al. |
| 3,181,124 | 4/1965 | Hammel _____ 340—152 X |
| 3,185,959 | 5/1965 | Barker _____ 340—38 |
| 3,254,324 | 5/1966 | Casciato et al. ____ 340—172.5 X |

MALCOLM A. MORRISON, *Primary Examiner.*

I. KESCHNER, *Assistant Examiner.*